Oct. 6, 1959 P. I. WYNDHAM 2,907,930
SIGNAL DETECTORS
Filed March 8, 1956 2 Sheets-Sheet 1
FIG. 1.
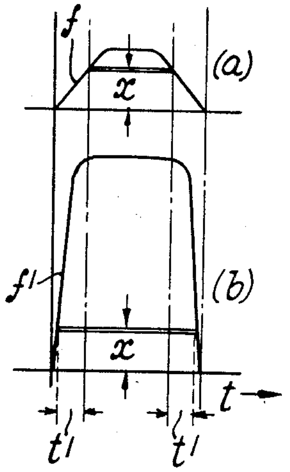
FIG. 3.
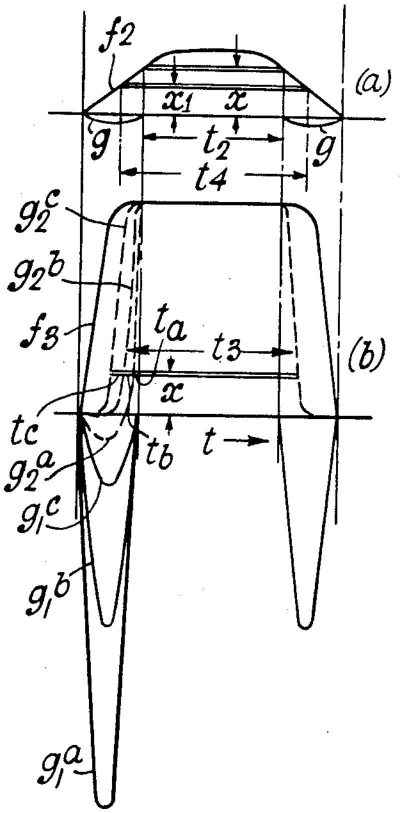
FIG. 4.
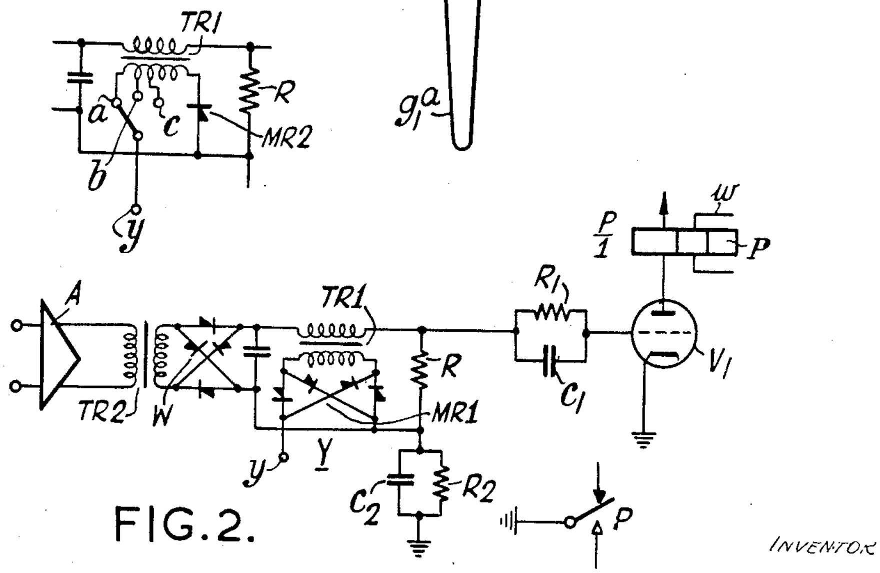
FIG. 2.
INVENTOR
PAUL IAN WYNDHAM
By Young, Emery & Thompson
ATTYS.

Oct. 6, 1959 P. I. WYNDHAM 2,907,930

SIGNAL DETECTORS

Filed March 8, 1956 2 Sheets-Sheet 2

INVENTOR

PAUL IAN WYNDHAM

BY Young, Emery & Thompson

ATTYS

United States Patent Office 2,907,930

Patented Oct. 6, 1959

2,907,930

SIGNAL DETECTORS

Paul Ian Wyndham, Saint Pauls Cray, England, assignor to Telephone Manufacturing Company Limited, London, England Application March 8, 1956, Serial No. 570,358

Claims priority, application Great Britain March 31, 1955

5 Claims. (Cl. 317—142)

The present invention relates to signal detectors and more particularly to low frequency signal detectors, e.g. detectors whose output is used to operate D.C. relays or switching devices.

A common form of signal detector, especially useful with voice-frequency signalling transmissions over audio circuits is the grid leak bias detector. This kind of detector is characterised by an inherent A.G.C. effect which, in general, enables it to operate satisfactorily with quite large input signal level variations. With one type of such detector the valve acts as a rectifier using the grid/cathode diode and also acts in the usual manner as a D.C. amplifier of the signal so produced to operate a relay in the output circuit. The grid biasing circuit is arranged so that grid current flows on the positive half cycles of A.C. signal current, and the time constant of the biasing circuit is made sufficiently large compared with the periodicity of the signal to maintain a constant bias for the remainder of the duration of the signal. The A.G.C. effect is due to the stabilising of the bias value for each different level of input signal.

In many conditions for example when sending dial pulses, it is desirable not to have tone present during the normal conversational condition. This mode of working is called in what follows "tone-off" as distinguished from "tone-on" in which the signal or dial pulse train is given by or represents a series of disconnections of tone on the line. When operating the above described detector the necessity for preserving a large time constant in the bias circuit makes it difficult to ensure that the bias circuit capacitor charges quickly enough when a tone is switched on after a rest period. Hence there is considerable distortion when a pulse train is sent in this condition this distortion lasting for several pulses until the bias voltage is established. This is unsatisfactory. Likewise the same requirement cannot be met in the known alternative type of detector wherein the rectification of an incoming A.C. signal is effected by separate means instead of in the valve circuit itself and wherein the valve acts only as a D.C. amplifier.

It is therefore important to modify this system in such a way that the bias voltage can build up very rapidly when tone is applied, while preserving the property that the effective duration of the pulses for operating the relay, and the intervals between pulses, should remain substantially unaltered for a wide range of level variation.

More specifically according to the present invention, in a signal detector or receiver of the kind wherein D.C. signals or rectified A.C. signals are used to operate a relay in the output circuit of an amplifier means are provided for counteracting the tendency of high level signals to give a longer operated time to the relay than low level signals, said means comprising a transient detector placed in the signal path to the amplifier and developing a transient bias voltage having an amplitude varying with the build-up or decay time of the signal envelope which bias is applied to the amplifier in opposition to the signal from which it was derived.

The transient bias voltage is applied in such relation to the leading or trailing edge of each signal at the input of the amplifier as to delay or advance the instant at which a signal operates or releases the relay, the said delay or advance depending on the amplitude of the signal from which the bias is derived and so tending to equalize the duration of the relay signals with high and low level input signals. In this context "operating instant" of the relay means the instant at which the contacts are closed as contrasted with the "release" instant which is the instant at which the contacts open.

According to a further feature of the invention the transient bias voltage and the grid bias due to flow of grid current are developed at a common grid input to the D.C. amplifier valve and this allows the grid current effect to be used to advantage for equalizing the effective duration of the relay signals. The advantage is most marked when the transient bias is derived from the leading edge of the rectified A.C. signal and for this and other reasons it is preferred to use only the leading edge transient bias.

The accompanying diagrammatic drawings are intended to explain the invention in more detail.

Figure 1 is a diagram illustrating the operation of a known type of detector;

Figure 2 is a simplified circuit which can be operated according to the invention;

Figure 3 is a diagram illustrating the mode of operation of a relay by a detector according to this invention.

Figure 4 is a preferred modification of Fig. 2;

Figure 5:
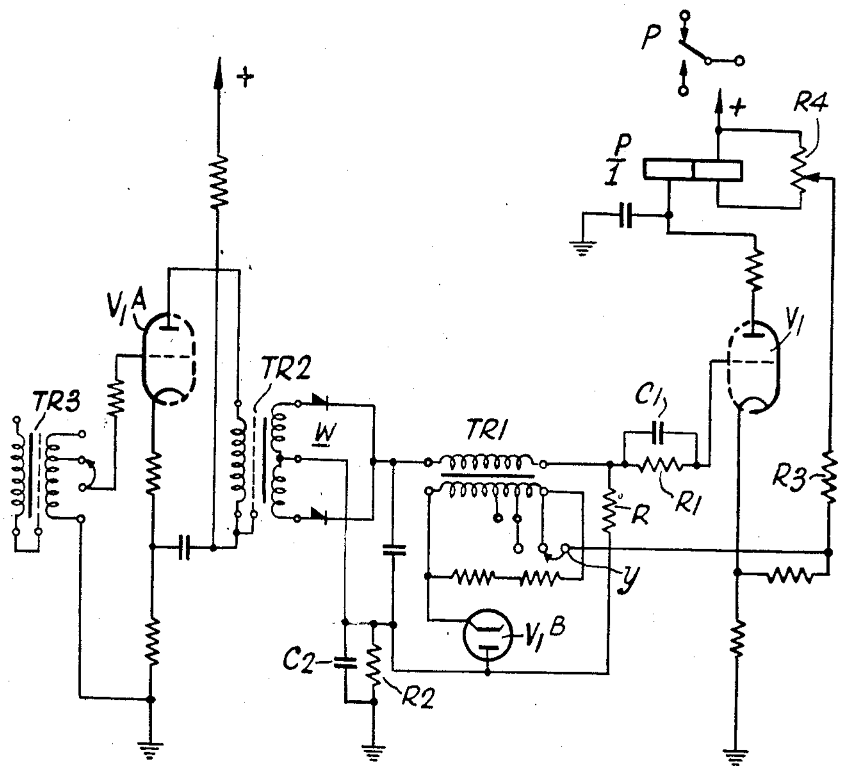
Figure 5 is a more complete circuit schematic of a detector similar to that of Fig. 4.

The operation of the known detectors is illustrated diagrammatically in Fig. 1 wherein (*a*) shows the relay response to a low level signal and (*b*) the response to a high level signal. It is assumed that carrier modulated signals of equal length are transmitted at the transmitter and that under certain transmission conditions signal (*a*) will be received and under other conditions signal (*b*) will be received after conversion at the receiver, the difference being greatly exaggerated in the sketch. The signalling relay operates at an effective D.C. signal level $x$, and the steep wave front $f_1$ of the A.C. signal envelope of the high level signal allows the D.C. output to attain the operating level earlier than in the case of the low level signal. From this it will be seen that the resultant D.C. signal indicated by the thick line in the case (*b*) is longer than in case (*a*) by a time $t_1$ at the front and tail whereas it is desirable that the effective D.C. signal which operates the relay should be equal in both cases.

It will be evident that the signal bias applied to the grid of a detector amplifier controls the duration of the output signal and that if the signal bias could be controlled in dependence on the slope of the signal envelope and in such a sense as to delay the inception or accelerate the decay of the D.C. signal at level $x$, the required result would be achieved.

One embodiment of a detector which may be operated in accordance with the invention is illustrated in Fig. 2. It is assumed that carrier wave modulated dialling signals are transmitted and that an incoming A.C. signal, say in the 4 kc./s. band, is amplified at A and is rectified by an A.C./D.C. converter W. The rectified signal is fed into a transient detector Y which is introduced between the input signal amplifier A and the D.C. amplifier consisting of valve $V_1$ with biasing circuit $R_1C_1$. The anode circuit of $V_1$ contains the load relay P which is provided in known manner with a bias winding *w* to neutralise the standing D.C. components passing through the operating winding of the relay and to permit compensating adjustments to be made for variations of the valve parameters and for other purposes. The converter delivers unidirectional pulses which are always accompanied by leading and trailing transient components. These transient components, at the front and rear of the D.C. signal appearing from the converter and flowing through the primary of transformer TR1 will induce a current in the secondary which, by virtue of the full wave rectifier MR1, and load resistor R2 will produce a charge on condenser C2 proportional to the slope of the A.C. signal envelope delivered from amplifier A, and hence proportional to the level of the A.C. signal incoming to amplifier A. The charge on C2 is arranged to be of such polarity that it opposes the D.C. signal coming from the A.C./D.C. converter W which, it will be understood establishes a potential across resistor R. The effect of the signal and the opposing bias is a resultant signal on the grid of valve $V_1$ whose duration is more independent of the A.C. signal level than it would be without the transient bias. This effect is illustrated in the diagram of Fig. 3 where (*a*) and (*b*) again show the effect of low and high level signals.

In (*a*) the transient bias $g$ produced in opposition to the D.C. initiating signal is negligible due to the small slope of the wave front $f_2$ of the A.C. signal envelope.

(*b*) the transient bias $g_1b$ is large due to the high slope of the wave front $f_3$ of the A.C. signal envelope. This opposes the D.C. initiating signal and so produces an effective D.C. input shown by the dotted curve $g_2b$ which limits the duration of the effective D.C. signal operating the relay to a value $t_3$ approaching the duration of $t_2$ of the D.C. signal derived from the low level A.C. signal.

Point $y$ of the transformer secondary may be connected to earth or alternatively to a positive biasing voltage source which will provide a threshold control for the value of transient bias. Likewise the grid of $V_1$ will be provided with a negative bias in known manner to reduce the standing anode current.

In practice, we have found that when the slope of the A.C. signal envelope is fairly high, i.e. approaching square form, as it will be in dialling signals, correction at both ends of the signal is not necessary. In general also for further reasons given below leading edge transient bias is preferable to trailing edge transient bias. Adequate correction for signal level variations is therefore provided if a half wave rectifier MR2 as shown in Fig. 4 is substituted for the full wave rectifier MR1, and in this case, one of the transient bias signals of Fig. 3 will not appear in the circuit of Fig. 4, the polarity of secondary winding of TR1 determining which pulse is suppressed. As shown the trailing pulse will be suppressed. Conveniently the rectifiers used may be of the semi-conductor class although thermionic diodes may as readily be used. The level of the transient bias can be adjusted as will be further described below.

It will be understood that in general the displacement of the transient bias signal with respect to the main signal will depend on the circuit constants of the secondary of TR1 and can be suitably adjusted. However, a further feature in the operation of this detector is that, given a transient bias circuit, the displacement of the transient signal bias varies with the level of the signal from which it is derived and that this is offset by the increased voltage across $R_1C_1$ with high level signals due to grid current so that although the transition times of the input and output signals may be slightly displaced, there is no appreciable distortion of the signal impulse duration with varying signal levels, so far as relay operation is concerned.

Additionally it has been found that the use of a common input circuit to the D.C. amplifier both for the grid bias circuit $R_1C_1$ and for the transient bias is beneficial in that when the transient bias is derived from the leading edge of the signal the transient bias modifies the bias developed across $R_1C_1$ by the grid current in such a manner that, in addition to the relay operating instant being delayed, the release instant of the relay is advanced.

In addition, due to the effect of grid current, the modified values of $R_1C_1$ influence the "operate" instant of the relay in the anode circuit of the valve. This is due to the influence of $R_1C_1$ on the rate of current rise in the relay windings between the time between the grid voltage becoming positive and the relay operating, thus effectively increasing the effects of mechanical and electrical inertia in the relay. Both of these effects are of advantage when using the leading edge transient bias to delay the "operate" instant of the relay and enhance the equalizing effect on the duration of the relay closure times, which normally would be longer for high level signals than for low level signals.

Although "tone-off" working has been referred to above signal detectors of the type described can also be employed to detect a signal element comprising a discontinuity of given duration in a continuous alternating current, this method of operation being commonly known as "tone-on" working.

When an input signal train comprises elements of duration $T_a$ separated by elements of duration $T_b$, due to the transit time $T_t$ of the relay moving contact, it is apparent that with a suitable bias, the detector output signal train will comprise elements of duration of $T_a$ separated by elements of duration $T_b-2T_t$ or elements of duration $T_b$ separated by a duration of $T_a-2T_t$. More specifically "tone-off" implies that if reversals are put in, originating say from pulses of 20 milliseconds on and 20 milliseconds off, the relay should ideally produce pulses of 20 milliseconds on the back contacts. Since the transit time of the relay is about 1 millisecond each way, this implies 18 milliseconds on the front contacts. "Tone-on" implies that with the same input, the relay should ideally give pulses of 20 milliseconds on the front contacts.

It is obvious that "tone-on" needs less negative bias in the D.C. amplifier than "tone-off" and it has not been found possible to maintain the relay pulse duration in each case merely by varying the relay bias. Control of the transient bias is also involved and the desired effect is achieved by giving less transient bias as well as less relay bias in the "tone-on" condition. The transient bias is reduced as will be described below by selecting only a portion of the total voltage across the transformer. The effect of a bias adjustment made on low level signals is illustrated schematically in Fig. 3(*a*) where $t_2$ indicates the contact operation under one set of conditions and $t_4$ under the other set. It will be noted that the level (transient) bias correction applied for the $t_2$ condition is inappropriate for the $t_4$ condition and accordingly it is a further feature of the present invention that the amplitude of the transient bias is so chosen that the detector applies a duration correction to the detected high level signal appropriate to the bias setting of the detector relay or like device.

The manner in which this may be performed is indicated schematically in Fig. 4, and is equally applicable to Fig. 2, where the secondary of transformer TR1 is shown provided with a selector switch having a number of tapping points $a$, $b$, $c$ which permit the selection of various step-by-step ratios and therefore the adjustment of the magnitude of the charge placed on C2 and the amplitude of the transient bias. The effect may also be secured by means of a variable load resistor across the secondary of TR1 or by varying the time constant of C2R2.

The effect of varying the amplitude of the transient bias in this manner is illustrated schematically on the leading edge of the signal element shown in Fig. 3(*b*) where $g_1a$ and $g_1c$ show the transient bias with a high and low step-up ratio respectively, corresponding to tapping points $a$ and $c$ in Fig. 4, $g_2a$ and $g_2c$ show the effective time displacement of the detected signal. By choice of rectifiers this correction can be applied to either end of the signal and the circuit can readily be arranged so that a simple switch action ganged to the selector of Fig. 4 converts the detector from tone-on to tone-off working or vice versa as desired.

Fig. 5 shows a schematic circuit diagram of the detector in Fig. 4 in more detail, corresponding references being used, where possible, for components having the same or similar function in the two figures. The receiving amplifier valve $V_1A$ corresponds to the amplifier A of Fig. 4 and the diode valve rectifier $V_1B$ corresponds to the half-wave rectifier MR2 of Fig. 4. The functions of the non-referenced components will be obvious to those conversant with the art and will therefore not be referred to.

The incoming carrier signals are applied to the primary winding of transformer TR3, which may be provided at the input side with a device for controlling the level of the incoming signals. The signals are amplified by triode $V_1A$ whose output is coupled through transformer TR2 to the A.C.-D.C. converter W, whose unidirectional output is passed through the transformer TR1. The transient detector comprising the transformer secondary and the diode rectifier $V_1B$ develops a transient bias voltage on condenser C2 and this is applied to the grid of the amplifier valve $V_1$ in opposition to the signal derived from the primary of transformer TR1, as already described with reference to Fig. 4.

In Fig. 5 the contacts of relay P are shown with no tone input to the detector, and switching from tone-on to tone-off operation is effected by the selector switch S in a manner already described above. An adjustable threshold value of the transient bias voltage is obtained by connecting point $y$ through resistors $R_3$ and $R_4$ to the positive terminal of the high voltage source, the latter also serving to adjust the bias winding $w$ of the relay P.

I claim:

1. In a signal detector for signals comprising pulses of direct current or rectified alternating current, an input circuit to which said signals are applied, an amplifying valve including an anode, a cathode and a control grid, a relay connected in circuit with said anode so as to be operated when said valve conducts, means for applying biasing potential to said control grid whereby said valve is rendered non-conducting in the absence of said signals, a rectifier in said input circuit for producing a D.C. potential corresponding to said signals, means for applying said rectified signal potential to said control grid, and means for also applying to said control grid in opposition to said rectified signal potential a potential dependent on the rate of change of said signal potential whereby the duration of operation of said relay will be substantially independent of said rate of change.

2. In a signal detector for signals comprising pulses of direct current or rectified alternating current, an input circuit to which said signals are applied, an amplifying valve including an anode, a cathode and a control grid, a relay connected in circuit with said anode so as to be operated when said valve conducts, means for applying biasing potential to said control grid whereby said valve is rendered non-conducting in the absence of said signals, a rectifier in said input circuit for producing a D.C. potential corresponding to said signals, means for applying said rectified signal potential to said control grid, and means for also applying to said control grid in opposition to said rectified signal potential a potential dependent on the rate of increase of said signal potential whereby the instant of operation of said relay will be delayed dependent on the steepness of said increase.

3. In a signal detector for signals comprising pulses of direct current or rectified alternating current, an input circuit to which said signals are applied, a first rectifier in said input circuit for producing a D.C. potential corresponding to said signals, a transformer having primary and secondary windings, an amplifying valve including an anode, a cathode and a control grid, a relay connected in circuit with said anode, means for applying said rectified signal potential by way of the primary of said transformer to the control grid of said valve, a second rectifier, means including said second rectifier for deriving bias potential from the secondary of said transformer in response to changes of current in said primary, and means for applying said bias potential to said control grid in opposition to said rectified signal potential, the steepness of the rise of said rectified signal potential thus serving to influence the instant of operation of said relay which occurs due to the increase in anode current of said valve.

4. In a signal detector for signals comprising pulses of direct current or rectified alternating current, an input circuit to which said signals are applied, a full-wave rectifier in said input circuit for producing a D.C. potential corresponding to said signals, a transformer having primary and secondary windings, an amplifying valve including an anode, a cathode and a control grid, a relay connected in circuit with said anode, means for applying said rectified signal potential by way of the primary of said transformer to the control grid of said valve, a half-wave rectifier, means including said half-wave rectifier for deriving pulses of bias potential from the secondary of said transformer in response to changes of current in said primary, a capacitor-resistor combination connected to a reference potential, means for applying said bias potential to said capacitor-resistor combination, and a resistor connected between said capacitor-resistor combination and said grid circuit, the relative steepness of the rise of said rectified signal potential thus serving to delay correspondingly the instant of operation of said relay which occurs due to the increase in anode current of said valve.

5. A signal detector as claimed in claim 3 in which means including tappings on said transformer are provided for adjusting the bias potential to different levels so as to suit the different operating conditions with "tone-on" and "tone-off" signalling systems.

References Cited in the file of this patent

UNITED STATES PATENTS 2,598,996 Harrison ______________ June 3, 1952